United States Patent
Kumar et al.

(10) Patent No.: US 7,945,786 B2
(45) Date of Patent: May 17, 2011

(54) METHOD AND APPARATUS TO RE-CREATE TRUST MODEL AFTER SLEEP STATE

(75) Inventors: Alok Kumar, Santa Clara, CA (US); Minal B. Patel, Long Beach, NY (US); Kuo-Lang Tseng, Cupertino, CA (US); Ramesh M. Thomas, Saratoga, CA (US); Madhukar Tallam, Fremont, CA (US); Aneet Chopra, San Jose, CA (US); Ned M. Smith, Beaverton, OR (US); David W. Grawrock, Aloha, OR (US); David Champagne, Princeton, NJ (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 11/731,164

(22) Filed: Mar. 30, 2007

(65) Prior Publication Data

US 2008/0244292 A1 Oct. 2, 2008

(51) Int. Cl.
*G06F 11/30* (2006.01)
*G06F 12/14* (2006.01)
*G06F 7/04* (2006.01)

(52) U.S. Cl. ........ 713/187; 713/165; 713/167; 713/189; 713/193; 713/194; 726/26; 380/44

(58) Field of Classification Search .................. 713/187, 713/189, 193–194, 164–167; 380/44; 726/26
See application file for complete search history.

(56) References Cited

U.S. PATENT DOCUMENTS

| | | | |
|---|---|---|---|
| 4,850,017 A * | 7/1989 | Matyas et al. | 380/280 |
| 2004/0003273 A1* | 1/2004 | Grawrock et al. | 713/193 |
| 2005/0132177 A1* | 6/2005 | Challener et al. | 713/1 |
| 2006/0015751 A1* | 1/2006 | Brickell et al. | 713/193 |
| 2007/0112999 A1* | 5/2007 | Oney et al. | 711/6 |

OTHER PUBLICATIONS

Intel Corporation, "LaGrande Technology Preliminary Architecture Specification", Sep. 2006, 82 pages.

* cited by examiner

*Primary Examiner* — Taghi T. Arani
*Assistant Examiner* — Madhuri Herzog
(74) *Attorney, Agent, or Firm* — Caven & Aghevli LLC

(57) ABSTRACT

A processing system features random access memory (RAM), a processor, and a trusted platform module (TPM). When the processing system enters a sleep mode during which the RAM is to stay powered, the processing system may measuring a VMM and one or more secure VMs in the processing system. However, the processing system may not measure or encrypt all of system memory. Upon resuming from sleep, the processing system may verify the measurements, to ensure that the VMM and secure VMs have not been tampered with. Other steps may include sealing encryption keys to the TPM, while preserving the blobs in memory. Other embodiments are described and claimed.

17 Claims, 3 Drawing Sheets

METHOD AND APPARATUS TO RE-CREATE TRUST MODEL AFTER SLEEP STATE

FIELD OF THE INVENTION

The present disclosure relates generally to the field of data processing, and more particularly to methods and related apparatus for resuming from a sleep state.

BACKGROUND

The Advanced Configuration and Power Interface (ACPI) is an open industry specification that describes industry-standard interfaces for configuration and power management on processing systems such as laptop, desktop, and server computers. Revision 3.0 of the ACPI Specification, dated Sep. 2, 2004, may be obtained from www.acpi.info/spec.htm. The ACPI specification describes various sleep states and global power states. The present invention, however, is not limited to ACPI-compliant systems, but may be used to advantage in any suitable processing system.

For purposes of this disclosure, a processing system can be in one of five power states:
  the active state (referred to herein as "S0");
  a sleeping state in which random access memory (RAM) and the processor are both powered (referred to herein as "S1");
  a sleeping state in which random access memory (RAM) is powered but the processor is not powered (referred to herein as "S3");
  the non-powered sleeping state, in which neither RAM nor the processor are powered (referred to herein as "S4"); or
  the off state (referred to herein as "S5" or "G0").
The sleeping states may also be referred to as sleep modes.

In the off state, the system is powered down, and the system does not contain system context for restoring processes from an earlier active state. To transition from the off state to the active state, the boot firmware must initialize the hardware and boot an OS.

In the active state, the system dispatches and executes threads. The system typically responds to external events substantially in real time—subject to delays attributable to factors such as the workload and the performance limits of the processing system. Nevertheless, various performance and power characteristics of the system may be dynamically adjusted within the active state. For instance, the power state of individual devices within the system may be changed dynamically when the processing system is in the active state. The active state may also be referred to as active mode.

For purposes of this disclosure, when a processing system is in a sleeping state, the processing system does not execute user mode threads, and the system consumes less power than in the active state. The system may appear to be off, in that various peripheral devices or indicators (e.g., the display, certain light emitting diodes (LEDs), etc.) may be powered down. In some circumstances, the processing system may consume no power or substantially no power in a sleeping state. To resume is to transition from a sleeping state to the active state.

A processing system may have security features that implement or provide a trust model when the processing system is active. For instance, the trust model may include verified measurements of a virtual machine monitor (VMM) and one or more secure virtual machines (VMs). For purposes of this disclosure, a secure VM is a virtual machine that performs some security operations and must require isolation from other virtual machines within the processing system and from other processing systems.

The Intel® Trusted Execution Technology Preliminary Architecture Specification, dated November 2006, (hereinafter the "Intel® TXT Specification") provides details for implementing and/or using security features pertaining to such trust models. The Intel® TXT Specification is currently available at www.intel.com/technology/security.

Some of the security features of the processing system, however, may be off during S3, S4, and S5 states, when the processor and chipset are off. The present disclosure introduces technology for re-establishing the security and the trust model of a processing system when the processing system resumes from one or more sleep states.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

This disclosure describes an example embodiment of a solution to the problem of re-creating a trust model after S3 sleep. The described embodiment involves a processing system with support for security features such as those described in the Intel® TXT Specification. In alternative embodiments, similar mechanisms can be used for other platforms.

Intel® TXT involves hardware features that provide for creation of a trust boundary across a VMM and across VMs. Intel® TXT provides hardware capabilities for trusted platforms by providing a measured and verified (trusted) launch; measurement, secure and sealed storage, and reporting capabilities; and individual identity through a TPM. For example, the central processing unit (CPU) in a platform with Intel® TXT may provide secure machine extension (SMX) instructions, and a TPM in the platform may provide cryptographic keys, as well as measurement and sealed storage facilities. Such features may form the basis of the trusted platform, by enabling proof of identity and integrity status of the platform. Thus, such features may be said to "harden" the platform.

Figure 1:
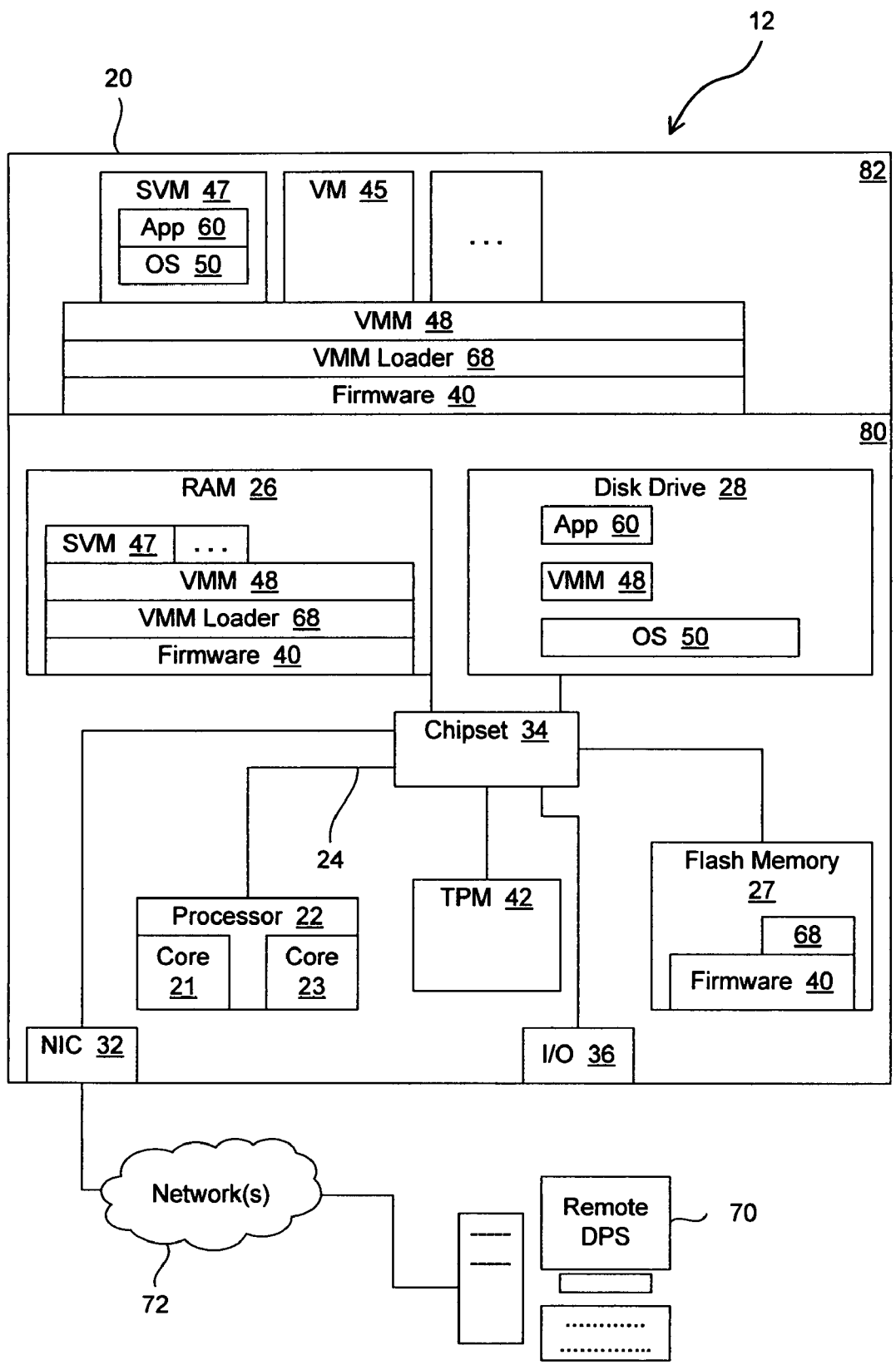
FIG. 1 is a block diagram depicting an example data processing environment.

FIG. 1 is a block diagram depicting an example data processing environment 12. Data processing environment 12 includes a local data processing system 20 that includes various hardware components 80 and software components 82, including features for Intel® TXT.

The hardware components may include, for example, one or more processors or central processing units (CPUs) 22 communicatively coupled to various other components via one or more system buses 24 or other communication pathways or mediums. As used herein, the term "bus" includes communication pathways that may be shared by more than two devices, as well as point-to-point pathways. Processor 22 may include two or more processing units, such as processing unit 21 and processing unit 23. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols. Information on WiMAX protocols is currently available at grouper.ieee.org/groups/802/16/published.html.

Within processing system 20, processor 22 may be communicatively coupled to one or more volatile data storage devices, such as random access memory (RAM) 26, and to one or more nonvolatile data storage devices. In the example embodiment, the nonvolatile data storage devices include flash memory 27 and hard disk drive 28. In alternative embodiments, multiple nonvolatile memory devices and/or multiple disk drives may be used for nonvolatile storage. Suitable nonvolatile storage devices and/or media may include, without limitation, integrated drive electronics (IDE) and small computer system interface (SCSI) hard drives, optical storage, tapes, floppy disks, read-only memory (ROM), memory sticks, digital video disks (DVDs), biological storage, polymer memory, etc. As used herein, the term "nonvolatile storage" refers to disk drives, flash memory, and any other storage component that can retain data when the processing system is powered off. And more specifically, the term "nonvolatile memory" refers to memory devices (e.g., flash memory) that do not use rotating media but still can retain data when the processing system is powered off. The terms "flash memory" and "ROM" are used herein to refer broadly to nonvolatile memory devices such as erasable programmable ROM (EPROM), electrically erasable programmable ROM (EEPROM), flash ROM, etc.

Processor 22 may also be communicatively coupled to additional components, such as NIC 32, a trusted platform module (TPM) 42, video controllers, IDE controllers, SCSI controllers, universal serial bus (USB) controllers, input/output (I/O) ports, input devices, output devices, etc. Processing system 20 may also include a chipset 34 with one or more bridges or hubs, such as a memory controller hub, an I/O controller hub, a PCI root bridge, etc., for communicatively coupling system components. Some components, such as NIC 32, for example, may be implemented as adapter cards with interfaces (e.g., a PCI connector) for communicating with a bus. Alternatively, NIC 32 and/or other devices may be implemented as embedded controllers, using components such as programmable or non-programmable logic devices or arrays, application-specific integrated circuits (ASICs), embedded computers, smart cards, etc.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing and/or transmitting information.

An embodiment of the invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. As used herein, the term "program" covers a broad range of software components and constructs, including applications, modules, drivers, routines, subprograms, methods, processes, threads, and other types of software components. Also, the term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. For instance, data storage device 28 and/or flash memory 27 may include various sets of instructions which, when executed, perform various operations. Such sets of instructions may be referred to in general as software.

As illustrated in FIG. 1, in the example embodiment, the programs or software components 82 may include system firmware 40 and a VMM 48. System firmware 40 may include boot firmware for managing the boot process, as well as runtime modules or instructions that can be executed after the OS boot code has been called. System firmware 40 may also be referred to as a basic input/output system (BIOS) 40. VMM 48 may create and manage one or more VMs 45. In the example embodiment, the VMs include a secure VM (SVM) 47. Each VM may include an OS 50 and one or more applications 60. Multiple SVMs may be used in alternative embodiments. In processing system 20, VMM 48 traps when the system is going to S3 sleep.

For processing system 20 to resume from S3 or S4 sleep, the platform trust environment and security should be exactly the same as before the sleep. Since RAM 26 is turned off in case of S4, whole system memory can be used to re-establish trust similar to what is done for a cold boot (e.g., boot from S5). However, in S3, RAM 26 is not turned off. Therefore, during S3 resume, since, the system memory is in use, it is not available to re-establish trust for the underlying platform and for VMM 48. Furthermore, each secure VM 49 should come back in same state as before.

For a reliable trust model, processing system 20 should re-create the trust environment to be in the same state as for a cold boot. If VMM 48 or secure VM 47 has changed (e.g., due to code execution), processing system 20 should detect that the environment may not be trustworthy.

Processing system 20 may be considered a trusted platform, based on a root of trust. The root of trust starts with the hardware platform (e.g., CPU 22, chipset 34, and TPM 42) being trusted, and this trust is extended by measuring and trusting other components, forming a chain of trust with BIOS 40, the master boot record (MBR) on disk drive 28, the boot loader, VMM 48, the OS loader, and the applications. The overall root of trust includes three components: a root of trust for measurement, a root of trust for storage, and a root of trust for reporting. These roots of trust ensure the integrity of the measurements, storage of the measurements and reporting of the measurements, respectively. For purposes of this disclosure, unless one of these components is specifically identified, the term "root of trust" refers to the overall root of trust.

The SMX GETSEC[SENTER] instruction (referred to herein as "SENTER") provides a capability of late launch. That is, SENTER can be executed to start the root of trust at a later stage in launch, such as after an OS has been launched. The SENTER instruction uses hardware features to verify the root of trust code, the secure initialization (SINIT) authenticated code (AC) module, and to start a dynamic chain of trust. A VMM loader 68, which is the first program that runs after the SINIT AC module, loads VMM 48.

Figure 2:
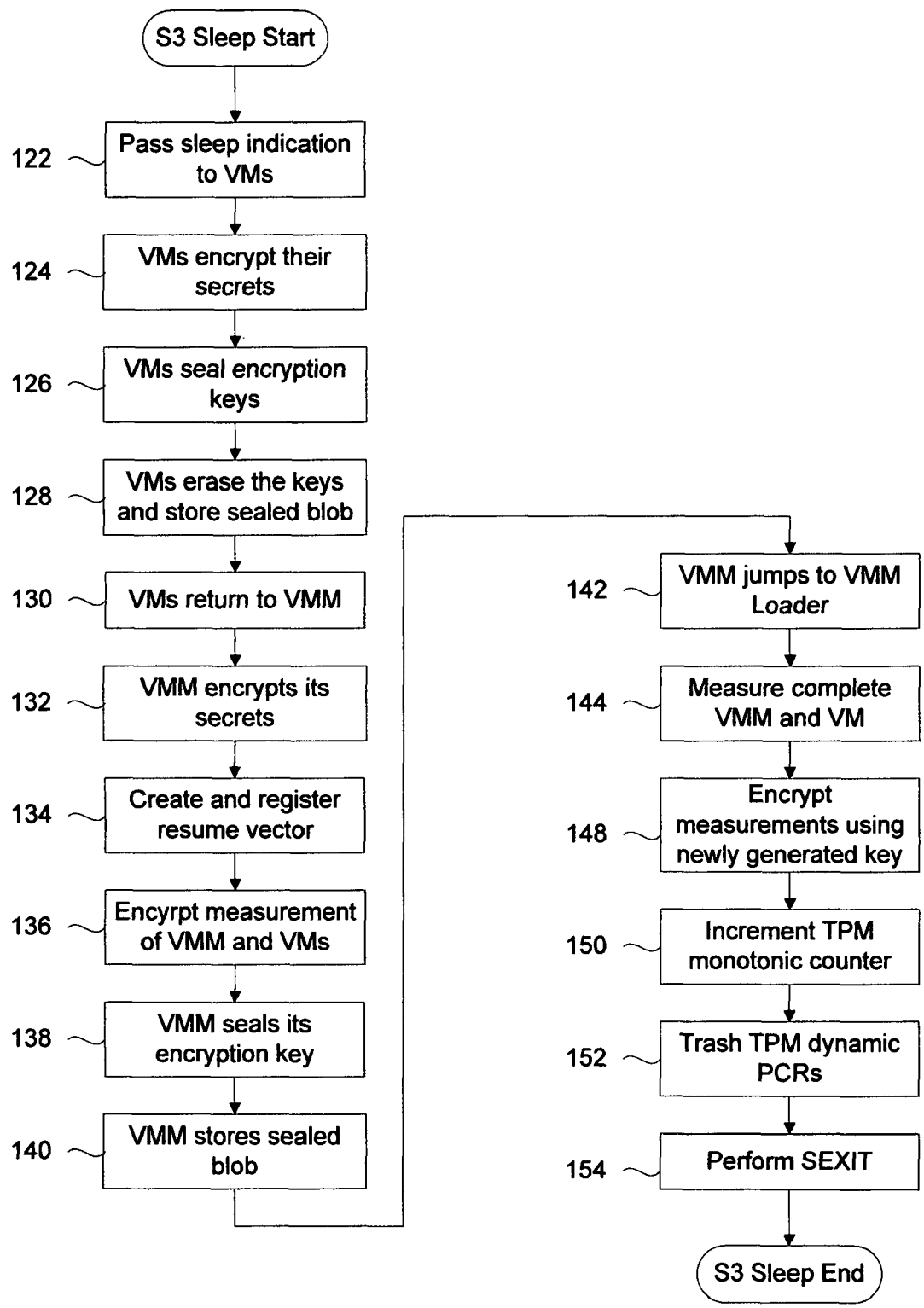
FIGS. 2 and 3 are flowcharts depicting various aspects of example sleep and resume processes executed by the processing system of FIG. 1.
Figure 3:
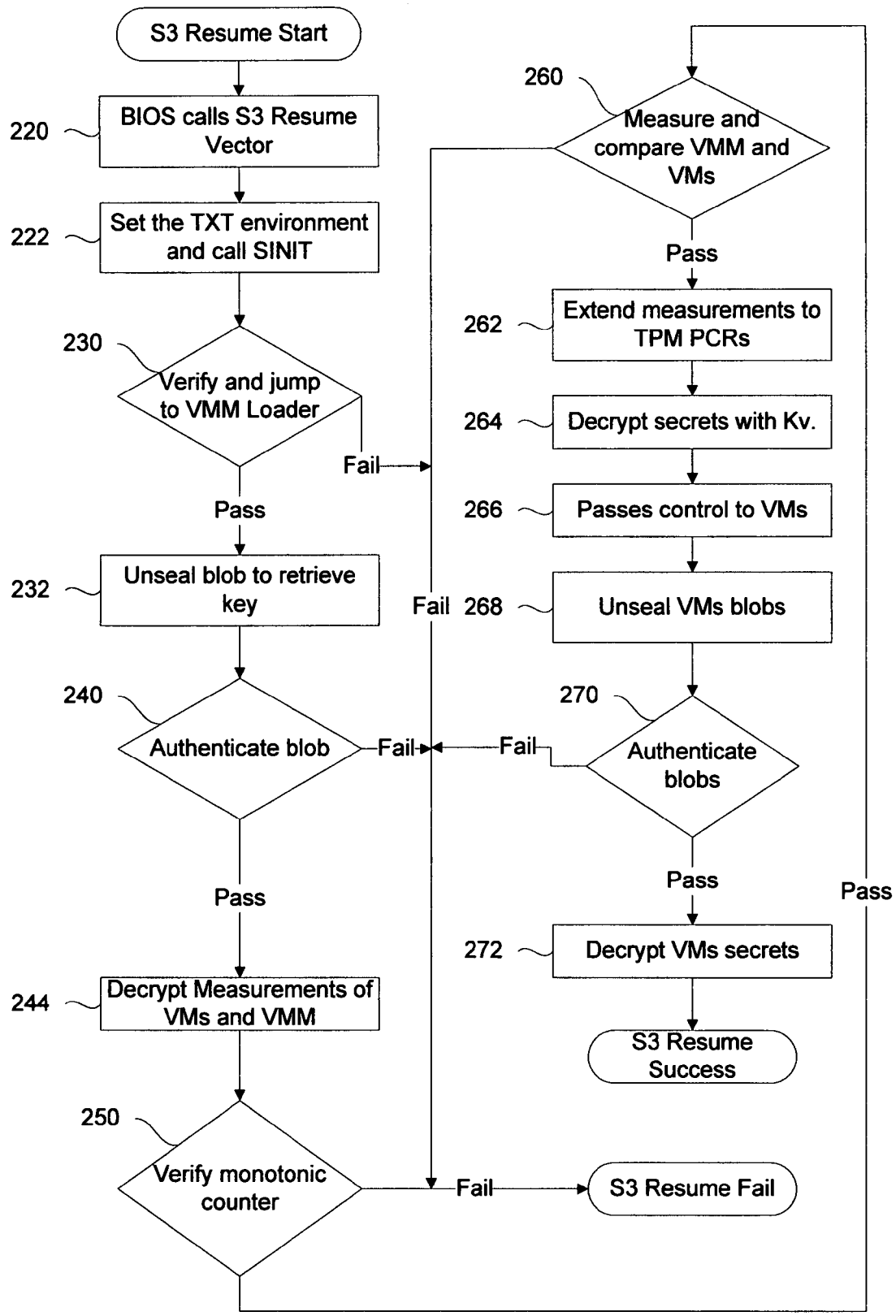

FIGS. 2 and 3 are flowcharts depicting various aspects of example sleep and resume processes executed by processing system 20. In particular, the illustrated processes involve entering and resuming from the S3 sleep state. In those processes, some or all encryptions may be done using symmetric keys (e.g., Kn) that are generated on every S3 sleep to provide additional security.

The process of FIG. 2 starts with processing system 20 preparing to enter the S3 sleep mode. As depicted at block 122, VMM 48 detects that processing system 20 is to enter S3 sleep and in response passes the S3 sleep indication to all secure VMs, which in the example embodiment consists of SVM 47. As shown at block 124, each of the secure VMs encrypts its secrets in memory with a key, Kn. The secrets of a secure VM may be keys used by the secure VM to protect communications with other processing system, for instance, or any other information that is to provide enhanced protection against detection by other processing systems or programs.

As depicted at block 126, the secure VMs then seal their encryption keys, Kn, with the TPM SRK, on SINIT, VMM loader, VMM, and secure VM platform configuration registers (PCRs). That is, each secure VM generates a sealed blob, Sn, with Kn as data and the storage root key (SRK) of TPM 42 as the encryption key, and stores that blob in its memory. The sealed blob can only be decrypted by the secure VM, as guaranteed by the TPM.

As shown at block 128, each secure VM then erases its Kn and stores its Sn in main memory (e.g., RAM 26). As depicted at block 130, the secure VMs then return control to VMM 48.

As shown at block 132, VMM 48 then encrypts its secrets in memory with key, Kv. As shown at block 134, VMM 48 then creates an S3 resume vector and registers it with BIOS 40. As depicted at block 136, VMM 48 then encrypts the original measurements of VMM 48 and the secure VMs with key, Kv, and stores the encrypted measurement in RAM 26. As shown at block 138, VMM 48 then seals its encryption key with the TPM SRK on the SINIT and VMM Loader PCRs. As depicted at block 140, VMM 48 then stores the sealed blob, Sv, in RAM 26. As depicted at block 142, VMM 48 then jumps to VMM loader 68.

As shown at block 144, VMM loader 68 then measures the complete VMM 48 and all secure VMs memory to M. As depicted at block 148, VMM loader 68 then generates a key, Ko, by exclusive-or-ing (XORing) Kv and some fixed pattern. As shown at block 148, VMM loader 68 then encrypts M and the TPM monotonic counter to EM with Ko, and stores EM in RAM 26. It also erases Ko from the main memory. As depicted at block 150, VMM loader 68 then increments the TPM monotonic counter. As shown at block 152, VMM loader 68 then trashes/changes all TPM dynamic PCRs. As depicted at block 154, VMM loader 68 then performs a secure exit (SEXIT). Processing system 20 may then enter the S3 sleep mode.

FIG. 3 depicts an example process for resuming from S3 sleep. As shown at block 220, the illustrated process begins with BIOS 40 calling the S3 resume vector that was set by VMM in block 134 of FIG. 2. As depicted at block 222, the code at the S3 resume vector sets the TXT environment by calling the SENTER instruction. The SENTER instruction executes SINIT. In particular, the code at the S3 resume vector may set the TXT environment by loading and running TXT launch code of VMM loader 68. The TXT launch code may execute the GETSEC[SENTER] instruction to bring up SINIT. As shown at block 230, SINIT measures and verifies VMM loader 68 and jumps to VMM loader 68. If the VMM loader fails verification, the S3 resume process may fail.

Otherwise, as depicted at block 232, VMM loader 68 may then unseal the blob, Sv, to retrieve the key, Kv. As shown at block 240, VMM loader 68 then performs the blob authentication for Kv. If Kv fails authentication, the S3 resume process may fail. Otherwise, VMM loader 68 generates key, Ko, by XORing Kv and the fixed pattern. As shown at block 244, VMM loader 68 then decrypts EM with Ko to retrieve M, measurements of pre-S3 state of VMM 48, the secure VMs, and the TPM monotonic counter. As depicted at block 250, VMM loader 68 then verifies the hardware monotonic counter with the decrypted value. For instance, VMM loader 68 may check to see that the present counter is one greater than the old counter. If the monotonic counter fails verification, the S3 resume process may fail. Otherwise, as shown at block 260, the VMM loader measures VMM 48 and the secure VMs, and compares that measurement with M. If the measurements do not match, the S3 resume process may fail. Otherwise, as depicted at block 262, the VMM loader extends the original measurements of VMM 48 and the secure VMs to appropriate TPM PCRs.

As shown at block 264, VMM 48 then decrypts its secrets with Kv. As depicted at block 266, VMM 48 then passes control to the secure VMs.

As shown at block 268, each of the secure VMs unseals its blob, Sn, to its key, Kn. As depicted at block 270, each secure VM also performs the blob authentication for Kv. If that authentication fails for any of the secure VMs, the S3 resume process may fail. Otherwise, as shown at block 272, the secure VMs decrypt their secrets with Kn. Consequently, the S3 resume process may complete successfully.

By contrast, a naïve solution for S3 sleep and resume in a secure environment might require encrypting the complete system memory and sealing the key in the TPM. Such a process would require substantially more time than a process like the one described above.

Also, part of the memory may need to be stored in the hard disk drive (HDD) to leave some space to setup the TXT environment. On resume, TXT may be setup using the empty memory, and then part of the encrypted memory may be copied back from the HDD to memory. Then, all the memory would need to be decrypted before S3 resume is success. Again, the above solution could save a considerable amount of time by not encrypting all of the system memory.

Some of the steps that allow for such benefits include measuring the VMM and the secure VMs, but not all of system memory, and then verifying the measurements after S3. Other steps include sealing the keys to the TPM, while preserving the blobs in memory, which may not impact TPM non-volatile memory lifetime.

In light of the principles and example embodiments described and illustrated herein, it will be recognized that the described embodiments can be modified in arrangement and detail without departing from such principles. For instance, although one embodiment is described above as using a hard disk and flash memory as nonvolatile storage, alternative embodiments may use only the hard disk, only flash memory, only some other kind of nonvolatile storage, or any suitable combination of nonvolatile storage technologies.

Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multiprocessor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method, comprising:
in response to detecting, at a virtual machine (VM) of a processing system, that the processing system is to enter a sleep mode during which random access memory (RAM) is to stay powered and a processor is not to stay powered, using at least one key "Kn" to encrypt a portion of data belonging to the VM, but not all data belonging to the VM;
using a storage root key (SRK) from a trusted platform module (TPM) in the processing system to seal Kn;
using at least one key "Kv" to encrypt a portion of data belonging to a virtual machine monitor (VMM) of the processing system;
using the SRK to seal Kv;
using Kv to generate a key "Ko";
computing a measurement "M" of a pre-sleep state of the VMM and the VM;
using Ko to encrypt M into an encrypted measurement "EM";
after generating EM, entering the sleep mode;
during a resume process for resuming from the sleep mode, measuring and verifying a VMM loader;
using the VMM loader to unseal Kv and to authenticate Kv;
using Kv to regenerate Ko;
using Ko to decrypt EM into M;
computing a new measurement M2 of a post-sleep state of the VMM and the VM;
comparing M2 with M;
preventing the processing system from successfully completing the resume process if M2 does not match M, wherein each VM is to erase its Kn after sealing its encryption key Kn.

2. A method according to claim 1, further comprising:
before entering the sleep mode, registering a resume vector with a basic input/output system (BIOS) of the processing system; and
modifying at least one dynamic platform configuration register (PCR) in the TPM.

3. A method according to claim 1, wherein:
the operation of using Ko to encrypt M into an EM comprises including a value from a monotonic counter of the TPM in M; and
the operation of using Ko to decrypt EM into M comprises regenerating the value from the monotonic counter; and
preventing the processing system from successfully completing the resume process if the regenerated value is not within a predetermined distance from a current value of the monotonic counter.

4. A method according to claim 1, wherein the portion of data belonging to the VM to be encrypted comprises at least one encryption key used by the VM.

5. A method according to claim 1, wherein:
the portion of data belonging to the VM to be encrypted comprises at least one encryption key used by the VM; and
the portion of data belonging to the VMM to be encrypted comprises at least one encryption key used by the VMM.

6. A processing system, comprising:
a processor with at least one processing core;
random access memory (RAM) responsive to the processor;
a trusted platform module (TPM) responsive to the processor; and
sleep control logic operable to perform operations comprising:
in response to detecting, at a virtual machine (VM) of the processing system, that the processing system is to enter a sleep mode during which the RAM is to stay powered and a processor is not to stay powered, using at least one key "Kn" to encrypt a portion of data belonging to the VM, but not all data belonging to the VM;
using a storage root key (SRK) from the TPM to seal Kn;

using at least one key "Kv" to encrypt a portion of data belonging to a virtual machine monitor (VMM) of the processing system;
using the SRK to seal Kv;
using Kv to generate a key "Ko";
computing a measurement "M" of a pre-sleep state of the VMM and the VM;
using Ko to encrypt M into an encrypted measurement "EM";
after generating EM, entering the sleep mode;
during a resume process for resuming from the sleep mode, measuring and verifying a VMM loader;
using the VMM loader to unseal Kv and to authenticate Kv;
using Kv to regenerate Ko;
using Ko to decrypt EM into M;
computing a new measurement M2 of a post-sleep state of the VMM and the VM;
comparing M2 with M;
preventing the processing system from successfully completing the resume process if M2 does not match M, wherein each VM is to erase its Kn after sealing its encryption key Kn.

7. A processing system according to claim 6, wherein the operations to be performed by the sleep control logic further comprises:
before entering the sleep mode, registering a resume vector with a basic input/output system (BIOS) of the processing system; and
modifying at least one dynamic platform configuration register (PCR) in the TPM.

8. A processing system according to claim 6, wherein:
the operation of using Ko to encrypt M into an EM comprises including a value from a monotonic counter of the TPM in M; and
the operation of using Ko to decrypt EM into M comprises regenerating the value from the monotonic counter; and
the sleep control logic is operable to prevent the processing system from successfully completing the resume process if the regenerated value is not within a predetermined distance from a current value of the monotonic counter.

9. A processing system according to claim 6, wherein the portion of data belonging to the VM to be encrypted comprises at least one encryption key used by the VM.

10. A processing system according to claim 6, wherein:
the portion of data belonging to the VM to be encrypted comprises at least one encryption key used by the VM; and
the portion of data belonging to the VMM to be encrypted comprises at least one encryption key used by the VMM.

11. An apparatus, comprising:
a non-transitory machine-accessible medium; and
instructions in the machine-accessible medium, wherein the instructions, when executed by a processing system, cause the processing system to perform operations comprising:
in response to detecting, at a virtual machine (VM) of a processing system, that the processing system is to enter a sleep mode during which random access memory (RAM) is to stay powered and a processor is not to stay powered, using at least one key "Kn" to encrypt a portion of data belonging to the VM, but not all data belonging to the VM;
using a storage root key (SRK) from a trusted platform module (TPM) in the processing system to seal Kn;
using at least one key "Kv" to encrypt a portion of data belonging to a virtual machine monitor (VMM) of the processing system;
using the SRK to seal Kv;
using Kv to generate a key "Ko";
computing a measurement "M" of a pre-sleep state of the VMM and the VM;
using Ko to encrypt M into an encrypted measurement "EM";
after generating EM, entering the sleep mode;
during a resume process for resuming from the sleep mode, measuring and verifying a VMM loader;
using the VMM loader to unseal Kv and to authenticate Kv;
using Kv to regenerate Ko;
using Ko to decrypt EM into M;
computing a new measurement M2 of a post-sleep state of the VMM and the VM;
comparing M2 with M;
preventing the processing system from successfully completing the resume process if M2 does not match M, wherein each VM is to erase its Kn after sealing its encryption key Kn.

12. An apparatus according to claim 11, wherein the instructions, when executed, cause the processing system to perform operations comprising:
before the processing system enters the sleep mode, registering a resume vector with a basic input/output system (BIOS) of the processing system; and
modifying at least one dynamic platform configuration register (PCR) in the TPM.

13. An apparatus according to claim 11, wherein:
the operation of using Ko to encrypt M into an EM comprises including a value from a monotonic counter of the TPM in M; and
the operation of using Ko to decrypt EM into M comprises regenerating the value from the monotonic counter; and
the instructions, when executed, prevent the processing system from successfully completing the resume process if the regenerated value is not within a predetermined distance from a current value of the monotonic counter.

14. An apparatus according to claim 11, wherein the portion of data belonging to the VMM to be encrypted comprises at least one encryption key used by the VMM.

15. The method of claim 1, wherein each VM is to store its sealed Kn in the RAM.

16. The processing system of claim 6, wherein each VM is to store its sealed Kn in the RAM.

17. The apparatus of claim 11, wherein each VM is to store its sealed Kn in the RAM.

* * * * *